US011400391B2

(12) United States Patent
Van De Wetering

(10) Patent No.: US 11,400,391 B2
(45) Date of Patent: Aug. 2, 2022

(54) SUCTION FILTER FOR LIQUIDS

(71) Applicant: NTZ NEDERLAND B.V., Rotterdam (NL)

(72) Inventor: Dick Van De Wetering, Ridderkerk (NL)

(73) Assignee: NTZ NEDERLAND B.V., Rotterdam (NL)

( * ) Notice: Subject to any disclaimer, the term of this patent is extended or adjusted under 35 U.S.C. 154(b) by 90 days.

(21) Appl. No.: 16/960,539

(22) PCT Filed: Jan. 8, 2018

(86) PCT No.: PCT/EP2018/050368
§ 371 (c)(1),
(2) Date: Jul. 7, 2020

(87) PCT Pub. No.: WO2019/134761
PCT Pub. Date: Jul. 11, 2019

(65) Prior Publication Data
US 2020/0368647 A1    Nov. 26, 2020

(51) Int. Cl.
*B01D 29/01*    (2006.01)
*B01D 35/30*    (2006.01)

(52) U.S. Cl.
CPC ........... *B01D 29/012* (2013.01); *B01D 35/30* (2013.01); *B01D 2201/0423* (2013.01); *B01D 2201/12* (2013.01); *B01D 2201/188* (2013.01); *B01D 2201/34* (2013.01)

(58) Field of Classification Search
CPC ............... B01D 29/012; B01D 35/30; B01D 2201/0423; B01D 2201/12;
(Continued)

(56) References Cited

U.S. PATENT DOCUMENTS 5,992,546 A    11/1999  Heinrich
7,875,171 B2    1/2011  Pekarsky et al.
(Continued)

FOREIGN PATENT DOCUMENTS

CA    2602631 A1    3/2008
CN    1094989 A    11/1994
(Continued)

OTHER PUBLICATIONS

English Machine Translation of JP2006316902A (Year: 2006).*
(Continued)

*Primary Examiner* — Madeline Gonzalez
(74) *Attorney, Agent, or Firm* — Maschoff Brennan

(57) ABSTRACT

The present invention relates to a suction filter unit (1) for filtering liquids. The filter unit (1) comprises: a housing element (3) with an open first side and an open opposing, second side, the housing element (3) comprising a first set of filter element supporting elements (23); a first cover (5) sealingly connected to the first side of the housing element (3); a second, different cover (7) sealingly connected to the second side of the housing element (3), the second cover (7) comprising a second set of filter element supporting elements (25); a filter unit inlet (9); a filter unit outlet; a first filter element (13) for providing a fine filtering property of the liquid; and a second filter element (21) arranged between the first filter element (13) and the inlet (9) for providing a coarse filtering property of the liquid. The second filter element (21) is clamped between the second cover and the housing element (3) by the first and second set of filter element supporting elements (23, 25).

16 Claims, 2 Drawing Sheets

(58) Field of Classification Search
CPC .......... B01D 2201/188; B01D 2201/34; B01D 29/07; B01D 29/56; F16H 57/0404
USPC ...... 210/493.1, 130, 172.3, 172.4, 258, 406, 210/416.1, 455, 445, 495, 453
See application file for complete search history.

(56) References Cited

U.S. PATENT DOCUMENTS

| | | | |
|---|---|---|---|
| 2006/0169632 A1 | 8/2006 | Suzuki et al. | |
| 2009/0114578 A1* | 5/2009 | Pekarsky ............. | B01D 35/147 210/123 |
| 2015/0129469 A1 | 5/2015 | Khalil | |
| 2016/0023140 A1 | 1/2016 | Anzt et al. | |

FOREIGN PATENT DOCUMENTS

| | | | |
|---|---|---|---|
| CN | 103328066 A | 9/2013 | |
| CN | 204907544 U | 12/2015 | |
| EP | 2 055 364 A2 | 5/2009 | |
| EP | 2055364 A2 | 5/2009 | |
| JP | 2006-316902 A | 11/2006 | |
| JP | 2006316902 | 11/2006 | |
| WO | 2012055102 A1 | 5/2012 | |

OTHER PUBLICATIONS

Chinese Notice of Allowance dated Jan. 20, 2022 as received in application No. 201880085484.0.
Chinese Office Action dated Sep. 6, 2021 as receive din application 201880085484.0.

* cited by examiner

SUCTION FILTER FOR LIQUIDS

TECHNICAL FIELD

The present invention relates to a suction filter for liquids, which may be used in automatic gearboxes of vehicles, for instance. The invention also relates to a manufacturing method of such a suction filter.

BACKGROUND OF THE INVENTION

Vehicle parts, such as engines and transmissions including automatic gearboxes, are often used with various oils or other internal fluids. Various filter units are known to remove contaminants or other materials from the fluids. In the case of transmissions, for example, filter units having a housing with only one open side, which in an assembled state is covered with a cover, are used. These kinds of filter units have one or more filter media with the fluid passing through the media under pressure and/or with suction applied to the filter on the outlet side. All these filter media are typically overmoulded in the housing to keep them in place. However, overmoulding complicates the filter unit design and its assembly. Furthermore, when the fluid is at a colder temperature, some fluids become highly viscous and may thus create a large pressure drop compared to warm operation. This issue needs to be also taken into account, which may further complicate the design of the filter unit. It is to be noted that the above considerations relating to filter units are not only valid for filter units used in vehicles but elsewhere as well where suction filters for liquids are used.

JP2006316902A discloses an oil filter for an automatic transmission which can suppress an early clogging of a filter element. The oil filter comprises: a casing having an oil inlet communicating with a filtration chamber and an oil outlet. A filter element is arranged inside the filter chamber of the casing. A pre-filter element is arranged at an upstream of the main filter element of the filter chamber of the casing, having coarser stitch than that of the main filter element.

EP2055364A2 discloses a filter assembly including a filter housing including an inlet through which hydraulic fluid enters the housing and an outlet through which hydraulic fluid exits the housing, a bypass valve housing containing a bypass valve located adjacent the inlet in a chamber, the bypass valve including an orifice that is opened and closed in response to differential pressure across the valve and a screen secured to the valve housing covering the orifice. The screen has a fine mesh for removing contaminants from the fluid that flows through the bypass valve.

SUMMARY OF THE INVENTION

It is an object of the present invention to overcome at least some of the problems identified above related to suction filters for liquids and/or their manufacturing.

According to a first aspect of the invention, there is provided a suction filter for liquids as recited in claim 1.

The proposed new solution has therefore the advantage that as the housing has an open design on two sides (top and bottom), one of the housing covers can be used to clamp one of the filter elements acting as a coarse filter. In this manner, there is no need to overmould this filter element or to attach it in any other manner to the housing, which simplifies the design and assembly of the filter unit. This also means that present solution reduces the cost in this type of filter design. The coarse filter element may be a polyester filter element, instead of a traditional metallic wire mesh. This means that the coarse element can be assembled leak-tight (around the edges of the coarse filter element). The use of the polyester material further reduces the cost in this type of filter design.

According to a second aspect of the invention, there is provided an automatic gearbox for a vehicle comprising the suction filter according to the first aspect of the present invention.

According to a third aspect of the invention, there is provided a method of manufacturing the suction filter as recited in claim 15.

Other aspects of the invention are recited in the dependent claims attached hereto.

BRIEF DESCRIPTION OF THE DRAWINGS

Other features and advantages of the invention will become apparent from the following description of a non-limiting example embodiment, with reference to the appended drawings, in which.

DETAILED DESCRIPTION OF AN EMBODIMENT OF THE INVENTION

Figure 1:
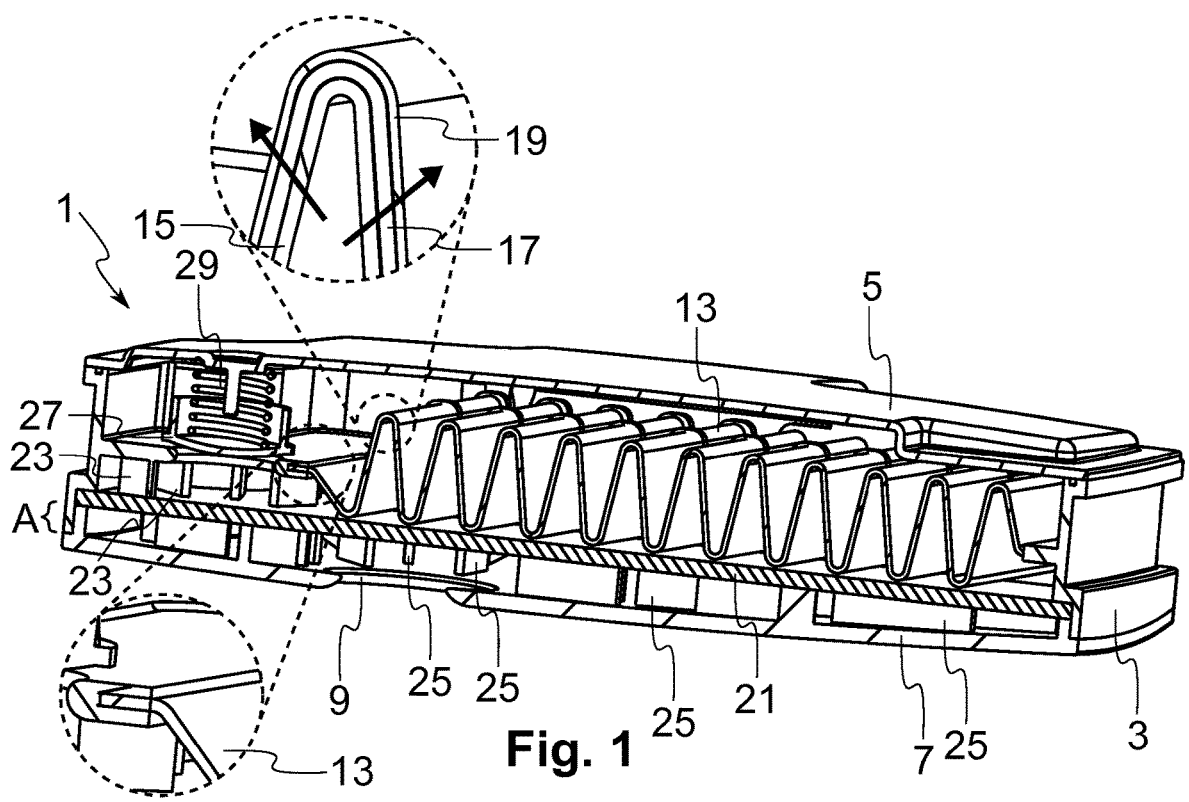
FIG. 1 is a cross-sectional view taken along a long side of an example suction filter unit according to an embodiment of the present invention.

An embodiment of the present invention will now be described in detail with reference to the attached figures. This embodiment is described in the context of an oil suction filter unit, also referred to simply as a suction filter, but the teachings of the present invention are also applicable to suction filter units for filtering other types of liquids, such as water. Identical or corresponding functional and structural elements which appear in the different drawings are assigned the same reference numerals.

FIG. 1 shows a cross-sectional side view of an example suction filter unit 1 for filtering hydraulic oil or other liquids. The filter unit 1 comprises a housing element or unit 3, which is placed between a first cover 5, referred to as a top cover, and a second cover 7, referred to as a bottom cover. The housing element 3, the top cover 5 and the bottom cover 7 are in this embodiment all physically separate elements and made of plastic and more specifically of thermoplastic. A liquid or oil inlet 9 in this example located on the bottom cover is provided to let the liquid flow into the filter unit, while a liquid or oil outlet 11 (shown in FIG. 2) in this example located on the housing element 3 is provided for collecting the filtered or cleaned liquid from the filter unit 1. The outlet 11 may be connected to an inlet of a suction pump (not illustrated in the drawings) to facilitate the liquid sucking operation towards the outlet. When in operation, the pressure outside the filter unit 1 is higher than the pressure inside the filter unit 1. This makes it easier to suck the liquid from the inlet 9 towards the outlet 11. Thus, the proposed suction filter unit 1 may be said to use vacuum filtration in the broad sense of the word, even if there may not be an absolute vacuum inside the filter unit. During a normal operation, the pressure inside the filter unit may be 30 kPa to 70 kPa or more specifically between 40 kPa to 60 kPa below the pressure outside the filter unit 1.

The filter unit 1 comprises a first filter element 13 or medium, which provides a first filtration property, which in this example is a fine filtration property. Thus, the first filter element 13 is a fine filter element, used for fine filtration of the oil and arranged inside the housing element 3. To increase the surface area of the first filter element, the first filter element is in this example a pleated filter element. The angle between two consecutive pleats is advantageously more than 10 degrees in order to create a reliably functioning injection moulding tool. The angle may be between 10 and 40 degrees, or more specifically between 15 and 30 degrees. Indeed, the pleated filter 13 is overmoulded with plastic (top and/or bottom surfaces) during the injection moulding. In other words, parts of the pleated filter are overmoulded with the housing material so that after the moulding process, the pleated filter is supported by the housing element 3 optionally along the longitudinal length of the pleated filter. In an alternative implementation, the first filter element 13 would be turned 90 degrees compared to the implementation shown in FIG. 1. In other words, according to this alternative implementation, the pleats would be arranged along the cross length of the housing element 3. Furthermore, both ends of the pleated filter are overmoulded (top and bottom surfaces) as shown in one of the enlarged views of FIG. 1. During the moulding process, the first filter element 13 is put in a mould cavity, and compressed when the mould closes. The plastic is then injected. After cooling, the first filter element 13 if fixed in place. A special shape in the mould (both sides) may be used to keep the filter element in place and to prevent it from washing away during mould cavity filling.

In the example illustrated in FIG. 1, and more specifically in the other enlarged view of FIG. 1 (the arrows indicating the oil flow direction), the first filter element 13 comprises three separate layers, namely:

A first layer 15, which is a first filter layer, and more specifically a coarse filter layer, and which is located on the upstream side. The coarse filter layer 15 is a layer of glass fibres, in this example with an efficiency $261_{22 \, \mu m} > 200$ (medium test dust). The beta efficiency can be defined as follows:

$$\beta_x = \frac{\text{Upstream (pre-filter) particle count @ } x \text{ particle size and larger}}{\text{Downstream (post-filter) particle count @ } x \text{ particle size and larger}}.$$

Furthermore, the maximum pore diameter of the coarse filter layer is in the range of 20 μm to 50 μm, and more specifically 30 μm to 40 μm. In this specific example, the maximum pore diameter is about 36 μm.

A second layer 17, which is a second filter layer, and more specifically a fine filter layer, and which is located next to the coarse filter layer. The fine filter layer is also a layer of glass fibres, in this example with an efficiency $261_{9 \, \mu m} > 200$ (medium test dust). Furthermore, the maximum pore diameter of the fine filter layer is in the range of 1 μm to 20 μm, and more specifically 5 μm to 15 μm. In this specific example, the maximum pore diameter of the fine filter layer 17 is about 12 μm.

A third layer 19, which is a support layer or screen, and which is located on the downstream side. The third layer is in this example a mesh and more specifically a metal mesh with large openings, i.e. openings larger than the maximum pore size of the coarse filter layer 15. The purpose of the third layer is to further structurally support the first and second layers (in addition to the support provided by the housing element 3, which is partially overmoulded on the first filter element).

In a variant of the present invention, the coarse filter layer 15 can be omitted. Thus, in this variant, the first filter element 13 would consist of the fine filter layer 17 and the support layer 19. In a further variant, the first filter element 13 comprises more than two filter layers, each optionally having a different filtration property. The advantage of a double pleat (two filter layers) is that small particles, which pass the coarse filter layer are trapped between the coarse and fine filter layers. For a single filter layer (single pleat), there is a risk of particles piling up at the surface of the filter. This is called cake forming. There is then a risk that with pulsed oil flows and/or if a bypass valve opens (as explained later), the particles from the cake could flow in the system. The advantage of a single pleat is that it has a simple structure and thus is relatively cheap to manufacture.

The filter unit 1 comprises also a second filter element 21, which provides a second filtration property (different from the first filtration property), which in this example is a coarse filtration property. Thus, the second filter element 21 is a coarse filter element or medium, used for coarse filtration of the oil and is arranged inside the housing element 3. In this embodiment, the second filter element 21 is a substantially flat fabric medium and arranged substantially parallel to a longitudinal axis of the housing element 3, which passes through the first filter element 13 and a valve 27 as explained later. More specifically, in this example, the second filter element 21 is a polyester filter medium. The fibres of the polyester are in this example bonded together by thermal bonding. The cross-sectional thickness of the second filter element 21 is between 1 mm and 10 mm and more specifically between 2 mm and 5 mm or more precisely between 2.5 mm and 3.5 mm. In this specific example, the cross-sectional thickness is about 2.8 mm. The weight of the polyester medium may be between 200 g/m$^2$ and 400 g/m$^2$, or more specifically between 250 g/m$^2$ and 350 g/m$^2$. In this specific example, the weight of the polyester medium is about 290 g/m$^2$. Furthermore, the maximum pore size may be between 200 μm and 300 μm or more specifically between 240 μm and 260 μm. In this specific example, the maximum pore size is about 250 μm while the average pore size may be between 40 μm and 130 μm or more specifically between 60 μm and 110 μm. In this specific example, it is about 85 μm. Thus, the polyester filter material acts as a coarse filter, and in this example large particles with diameter above 50 μm are filtered with an efficiency of about 70%, while particles with diameter above 80 μm with an efficiency of about 90%, using coarse test dust. The pressure drop of the polyester filter medium is relatively low (the pressure drop being strongly dependent on the oil viscosity), i.e. when using the above specifications, the pressure drop can be kept under 4 kPa even when the fluid flow rate is about 20 lit/min or slightly more.

The space between the top cover 5, the housing element 3 and the first filter element 13 define a first liquid compartment or chamber. The space between the housing element 3, the first filter element 13 and the second filter element define a second liquid compartment, while the space between the second filter element 21 and the bottom cover 7 alone define a third liquid compartment.

The housing element 3 comprises a first set of filter element supporting elements or means 23, which in this example are ribs, while the bottom cover comprises a second set of filter supporting elements or means 25, which in this example are also ribs. The purpose of these ribs is to hold the second filter element 21 in place in the housing element 3. In this manner, when the bottom cover 7 is in place, the second filter element 21 is arranged to be sandwiched between the ribs of the housing element 3 and the ribs of the bottom cover 7. In other words, when the bottom cover 7 is in place, then the second filter element 21 is clamped between the housing element 3 and the bottom cover 7. In this way, the filter material stays in its place even without using any other fixation means even at high oil flows and high oil viscosity. Furthermore, there is no need to have any other fixation means (such as overmoulding) to keep the second filter element 21 in place. Instead of being a polyester element, the second filter element 21 could be a metallic mesh for example. However, the polyester element is particularly advantageous because it can be compressed by the bottom cover 7 against the housing element 3 and the edges of the polyester element can thus be easily made leak tight. The ribs 23, 25 on the housing element 3 and on the bottom cover 7 are oriented so as to optimise the flow of the liquid from the inlet 9 towards the outlet 11. The ribs may or may not be parallel with respect to each other. Furthermore, at least some of them may be oriented vertically (when the filter unit 1 is placed on a flat horizontal surface). It is to be noted that some of the ribs (overmoulded) of the housing element 3 run on the first filter element 13 in one or more longitudinal lines along the surface of the first filter element. The number of the rib lines, which may run substantially parallel to each other, may be between 1 and 10 or more specifically between 2 and 5. Thus, these ribs also serve to strengthen the structure of the first filter element 13. These ribs 23 on the first filter element 13 could be replaced with parting walls (optionally substantially vertical) but they would likely somewhat disrupt the liquid flow inside the filter unit 1. Thus, the ribs running in one or more lines along the surface of the first filter element are particularly advantageous as they minimise any disruption of the liquid flow.

The filter unit 1 further comprises a bypass valve 27 operated by a biasing means 29, which in this example is a spring. When the bypass valve is closed, the oil filtered by the second filter element 21 is then filtered by the first filter element 13 before it reaches the outlet 11. However, if the pressure drop across the bypass valve 27 (or the first filter element 13) increases sufficiently to reach a predefined pressure level, then the spring 29 allows the bypass valve 27 to open. In this manner, once the liquid has been filtered by the second filter element 21, it can flow through the bypass directly to the outlet 11 without being filtered by the first filter element 13. In other words, the bypass defines a filter-free fluid connection between the second liquid compartment and the outlet 11. Thus, the valve 27 is pushed to a closed position by the spring 29, and released to an open position by the spring 29 if the pressure increases in the second compartment by 20 kPa to 40 kPa, for example, or more specifically by at least 30 kPa. The pressure can rise because the viscosity of the liquid is high at low temperatures (cold start), or because the first filter element 13 is blocked with particles for instance. For the bypass valve to operate correctly, it is advantageous that the pressure drop across the second filter element 21 can be kept relatively low, i.e. at a maximum level of 4 kPa, for instance.

Once the housing element 3 with the elements inside it has been finished, the housing element 3 may be closed to form a filter box by sealingly attaching the top and bottom covers 5, 7 to the housing element 3. In this example, both the top and bottom covers 5, 7 are welded to the housing element 3 by using laser welding, which is a neat and efficient way of attaching the covers to the housing element. It is to be noted that, although there are many methods for joining thermoplastics, laser plastic welding has some clear advantages: high joining quality, minimal resulting flash or particulates, higher quality control, less stress to the component and the ability to weld complex and intricate shapes. Laser plastic welding, sometimes also referred to as through-transmission welding, is a process of bonding plastic using focused laser radiation. The laser plastic welding concept involves passing a focused laser beam through an upper, laser transmissive part to the interface of the two parts to be joined. The laser light is turned into heat energy when it is absorbed by the lower joining partner. The heat created at the interface creates a molten weld seam allowing the two plastics to be fused.

There are four main process types or methods of laser plastic welding: quasi-simultaneous, contour, simultaneous and hybrid welding. Each process type has its own advantages and types of applications it is especially suited to. The quasi-simultaneous method is especially well suited to the present invention, although the other methods could be used instead. In this process, a single, focused laser beam is guided (by galvo-scanning mirrors for example), as it traces the weld path multiple times at a very high speed. In this manner, the entire joint line is effectively heated simultaneously or almost simultaneously. The quasi-simultaneous method is particularly advantageous because it has a fast cycle time, excellent process monitoring and it is a very flexible method. In the contour welding process, the laser beam, which is focused into a point, moves relative to the component making a single pass over the joint. However, instead of using laser plastic welding for fixing the covers to the housing element, any one of the following methods could be used: hot plate welding, hot gas welding, ultrasonic welding and vibration welding.

In the example of FIG. 1, the attachment regions or welding regions are on the outer periphery or circumference of the filter box at the locations where the top cover 5 and the bottom cover 7 are in contact with the housing element 3. In FIG. 1, these locations are shown at the top left and right corners, as well as at the bottom left and right corners. It is to be noted that in the example of FIG. 1, the second filter element 21 is vertically offset from the bottom welding region by a given distance. This distance may be for example between 1 mm and 20 mm, or more specifically between 2 mm and 10 mm. In this specific example, this distance is between 3 mm and 6 mm. The vertical distance allows the second filter element 21 to be positioned easier within the housing element 3.

Figure 2:
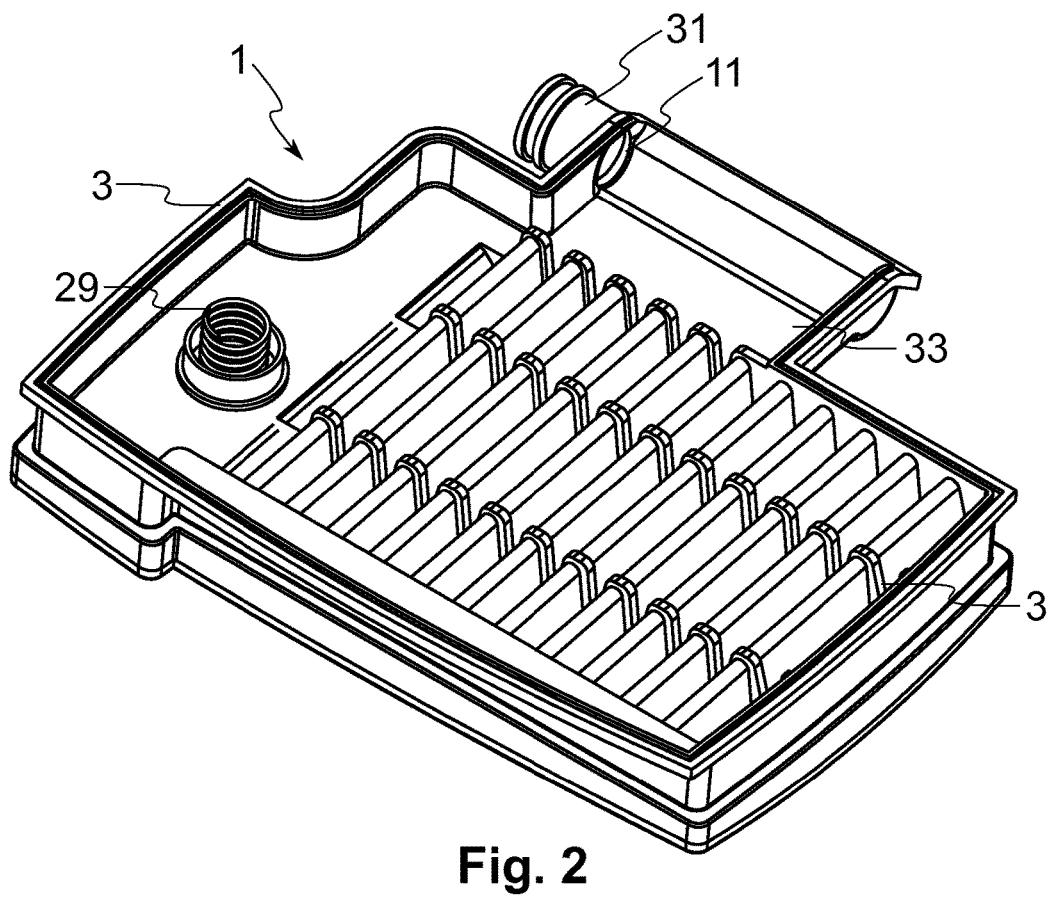
FIG. 2 is a top view of the suction filter unit of FIG. 1 without a top cover.

The shape of the housing element 3 is such that if the bypass valve 27 is opened, there is enough space for the oil flow to reduce pressure drop as is better shown in FIG. 2. This means that a passage is left for the fluid between the second filter element 21 and the housing element 3 for the fluid to reach the outlet 11 when the bypass valve 27 is open. Also, the shape of the outlet 11, which is connected to an outlet pipe 31 or tube (and more specifically to its proximal end), is rounded on the inside of the housing element 3 going from a larger cross section at the housing element side to a smaller cross section of a distal end of the outlet tube 31 to reduce pressure drop, where the distal end of the outlet pipe 31 is connected to the suction pump. This means that the cross section of the outlet pipe 31 steadily decreases towards the distal end of the outlet pipe.

Figure 3:
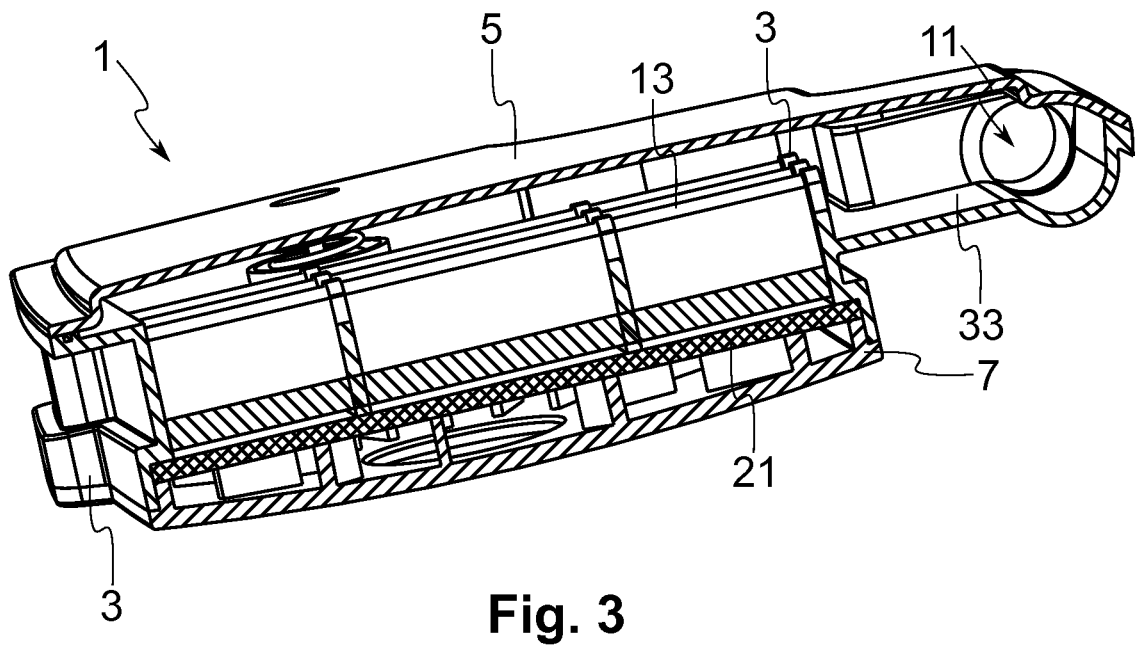
FIG. 3 is a cross-sectional view taken along a short side of the suction filter unit of FIG. 1.

In the example shown in FIGS. 2 and 3, the bottom surface of the outlet 11 is offset with respect to a dividing or parting surface or plane 33 of the housing element 3. However, this surface could be made flat to make the moulding process easier. Furthermore, the top cover 5 in the outlet region can bend (slightly) downwards, i.e. towards the outlet 11. This is advantageous if the filter unit 1 is placed in a gearbox of a vehicle to make space for a gear wheel located close to this region. As the cross-sectional diameter of the outlet on the inside of the housing element 3 is in this example greater than the vertical distance between the parting plane 33 and the top surface of the housing element 3, the top surface of the housing element can be made flat. This has the advantage that it is easy to connect the top cover 5 to the housing element 3 by using the laser plastic welding process, for instance.

At least one of the top cover 5, bottom cover 7 and the housing element 3 can be made curved, i.e. they may have a non-zero curvature in one, two or more directions. In this example, all these elements are made slightly curved to have a double curvature with the curvature directions being substantially orthogonal to each other to make these elements stronger, i.e. they resist better any deformation, which could otherwise be caused by the pressure difference between the outside and inside of the filter unit 1. More specifically, in this example, the top cover 5, bottom cover 7 and housing element 3 are convex to the outside, i.e. they are curved out or they extend outwards.

Figure 4:
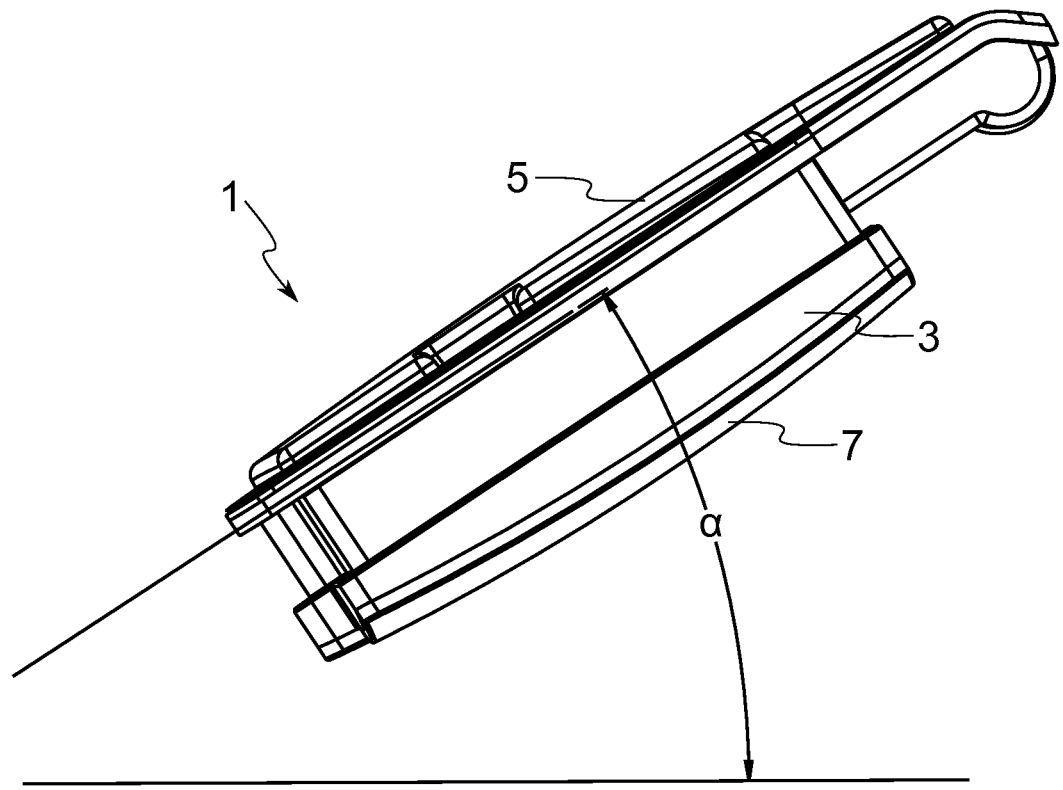
FIG. 4 is a side view of the suction filter unit of FIG. 1 showing an advantageous orientation of the suction filter unit when placed in a gearbox, for example.

The filter unit 1 is orientated in the gearbox, for example, in such a way that there is no risk of air accumulation that could pass uncontrolled to the outlet 11. This means that the filter unit 1 is advantageously angled with a non-zero angle α (when seen from the short end of the filter unit 1 corresponding to the width of the filter unit as opposed to the long side of the filter unit corresponding to the length of the filter unit) with respect to a flat horizontal surface as shown in FIG. 4. In other words, a lateral or side axis, which passes through the outlet and the first filter element (the axis being orthogonal to the longitudinal axis of the filter unit) is angled with an angle α with respect to a flat horizontal surface. This angle may be between 25 and 45 degrees, or more specifically between 30 and 40 degrees. In this specific example, this angle is about 33 degrees. The fixation of the filter unit 1 in a gearbox coupling space is implemented by the outlet pipe 31 and by adequate attachment means, such as outer ribs, on the housing element 3 and/or the cover(s) to keep it in place in x, y and z directions.

While the invention has been illustrated and described in detail in the drawings and foregoing description, such illustration and description are to be considered illustrative or exemplary and not restrictive, the invention being not limited to the disclosed embodiment. Other embodiments and variants are understood, and can be achieved by those skilled in the art when carrying out the claimed invention, based on a study of the drawings, the disclosure and the appended claims. For example, it is possible to combine teachings from at least two variants explained above to obtain further variants.

In the claims, the word "comprising" does not exclude other elements or steps, and the indefinite article "a" or "an" does not exclude a plurality. The mere fact that different features are recited in mutually different dependent claims does not indicate that a combination of these features cannot be advantageously used.

The invention claimed is:

1. A suction filter unit for filtering a liquid, the filter unit comprising:
   a housing element with an open first side and an open opposing, second side, the housing element comprising a first set of filter element supporting elements;
   a first cover sealingly connected to the first side of the housing element;
   a second, different cover sealingly connected to the second side of the housing element, the second cover comprising a second set of filter element supporting elements;
   a filter unit inlet;
   a filter unit outlet;
   a first filter element for providing a fine filtration property of the liquid; and
   a second filter element arranged between the first filter element and the inlet for providing a coarse filtration property of the liquid, the second filter element being clamped between the second cover and the housing element by the first and second set of filter element supporting elements,
   wherein the filter element supporting elements in the first and second sets are ribs,
   wherein the ribs are oriented nonparallel with respect to each other, and
   wherein the ribs in the second set are arranged along a longitudinal axis of the housing element.

2. The suction filter unit according to claim 1, wherein the second filter element is a polyester filter element.

3. The suction filter unit according to claim 1, wherein the second filter element is substantially flat and arranged substantially parallel to the longitudinal axis of the housing element.

4. The suction filter unit according to claim 1, wherein the cross-sectional thickness of the second filter element is between 2 mm and 5 mm.

5. The suction filter unit according to claim 1, wherein the location of the second filter element is offset from a fixation region of the second cover to the housing element.

6. The suction filter unit according to claim 5, wherein the offset distance between the second filter element and the fixation region is between 2 mm and 10 mm.

7. The suction filter unit according to claim 1, wherein the first filter element is a pleated filter element.

8. The suction filter unit according to claim 7, wherein the angle between two adjacent pleats is at least 10 degrees.

9. The suction filter unit according to claim 1, wherein at least one of the first set of filter element supporting elements runs longitudinally on the surface of the first filter element.

10. The suction filter unit according to claim 9, wherein the number of the filter element supporting elements on the surface of the first filter element is between 2 and 5.

11. The suction filter unit according to claim 1, wherein at least one of the following elements is outwardly curved: the housing element, the first cover and the second cover.

12. The suction filter unit according to claim 1, wherein the inlet is on the second cover while the outlet is on the housing element.

13. The suction filter unit according to claim 1, wherein the filter unit further comprises a bypass valve for providing a bypass for the first filter element when the pressure inside the filter unit reaches a given level.

14. An automatic gearbox for a vehicle comprising the filter unit according to claim 1.

15. A method of manufacturing the suction filter unit according to claim 1, wherein the method comprises:
   manufacturing the housing element with the first filter element inside it by injection moulding;
   placing the second filter element inside the housing element; and
   closing the housing element by attaching the first and second covers to the housing element.

16. The method according to claim 15, wherein the first and second covers are attached to the housing element by using any one of the following methods:
  laser welding,
  hot plate welding,
  hot gas welding, ultrasonic welding,
  and vibration welding.

\* \* \* \* \*